3,346,725
COMMUTATOR PULSE COUNTING APPARATUS
Robert B. Allured, Rochester, Anthony S. Strzelewicz, Roseville, and Martin Woods, St. Clair Shores, Mich., assignors to General Motors Corporation, Detroit, Mich., a corporation of Delaware
Filed July 10, 1964, Ser. No. 381,848
2 Claims. (Cl. 235—92)

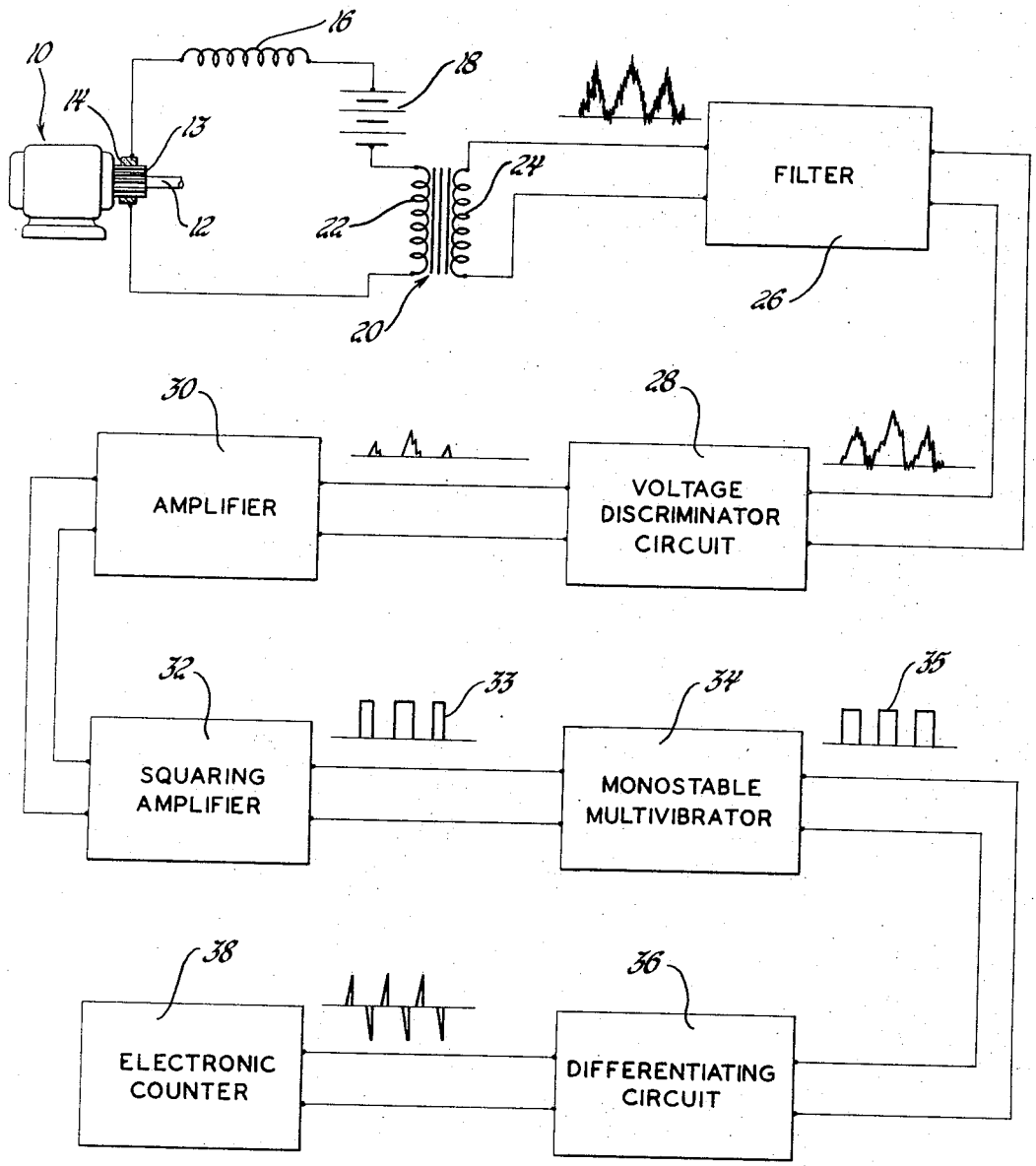

This invention relates to counting devices and more particularly to electronic devices for measuring the speed or counting the number of revolutions of the rotor of an electric motor.

It is often necessary to either measure the speed or count the number of revolutions of the rotor of an electric motor without having acess to the motor. The prior art devices for counting the number of revolutions made by the rotor required access to the motor or to the device it was operating.

As the rotor of an electric motor rotates, the commutator bars passing under the brushes induce pulses in the current flowing in the brush circuit. The number of pulses occurring during one rotor revolution is constant for a motor of a specific construction. Once this constant is determined for a motor of a specific construction, the number of revolutions of the rotor of any other motor of that construction can be determined by counting the pulses occurring in the brush current of such other motor. This constant can easily be determined by counting the pulses for a known time period while running a motor of this construction at a known speed or may be determined by merely counting the number of segments of the commutator.

The present invention detects these pulses and modifies them to actuate a standard electronic counter. The number of pulses indicated by this counter will always be proportional to the number of revolutions of the rotor. If the speed of the rotor is desired the number of pulses can be counted for a known time period.

One feature of this invention is that it provides an electronic device for measuring the speed of an electric motor or counting the number of revolutions of the rotor.

Another feature of this invention is that this device detects the pulses in the current flowing in the brush circuit of the motor and modifies these pulses to actuate an electronic counter.

Yet another feature is that this device measures the speed or counts the number of revolutions of the rotor without modifying the motor or having access to the rotor.

These and other features of this invention will be readily apparent from the following specification and drawing wherein:

The drawing is a schematic representation of a motor and a counting device according to this invention.

The motor designated generally 10 is a common series wound D.C. motor and includes a shaft or rotor 12 having a commutator 13 and brushes 14. Connected in series with the brushes are a field coil 16 and a source of D.C. power 18.

The transformer designated generally 20 has its primary coil 22 connected in the motor circuit to detect current variations therein. The primary coil is oriented so that a maximum positive signal is induced in the secondary coil 24. The transformer isolates the D.C. current flowing in the brush circuit from that flowing in the measuring circuit and increases the amplitude variations of the output. The output of the secondary coil of the transformer is fed to filter 26. This filter removes all high frequency components of the signal and permits pulses to be more easily detected. The filtered signal is then fed to the voltage discriminator circuit 28 which supplies output signals only when the voltage of the input signal is above a predetermined amplitude. This output signal which feeds amplifier 30 has a wave form identical to the wave form of that part of the input signal which is above the predetermined voltage.

Amplifier 30 increases the amplitude of this signal and then feeds the squaring amplifier 32. The output signal 33 of the squaring amplifier is a series of substantially square pulses of equal amplitude. One square pulse is produced in response to each input pulse, however, the time duration of the square pulses varies in relation to the amplitude and time duration of the input pulses. These square pulses are then applied to a monostable multivibrator 34 which produces uniform pulses of equal amplitude and time duration in response to input pulses regardles of the time duration of the input pulses. These uniform pulses 35 are then differentiated by differentiating circuit 36 and fed to the electronic counter 38.

The counter is a standard electronic counter which will indicate the number of pulses it receives. In some applications, such as checking the motor which operates automobile power windows, it is desirable to count the total number of revolutions of the rotor. This can be accomplished with the present device by counting all the pulses occurring during operation of the motor and dividing by the number of commutator segments between the brushes.

In other applications it is desirable to measure the speed of the motor. This can be done by operating the counter for a known period of time.

Thus this invention provides an electronic device for measuring the speed or counting the number of revolutions of the rotor of an electric motor.

We claim:
1. Apparatus for obtaining a digital representation of the amount of rotation of a D-C commutator motor having a commutator and brushes connected in an energizing circuit, said apparatus comprising a transformer for developing an output signal proportional to the voltage amplitude variations in said energizing circuit caused by movement of said commutator relative to said brushes, said transformer including a primary and a secondary winding, the primary winding being connected in said energizing circuit, filter means connected to said secondary winding for filtering said output signal to remove certain high frequency components, voltage discriminator means connected to said filter means for removing that portion of the output signal below a predetermined amplitude, pulse shaping means connected to said discriminator means for developing a pulsating output of uniform amplitude and time duration, and counting means connected to said pulse shaping means for counting each pulse of said pulsating output to thereby obtain a reading of the number of the segments of said commutator which have moved relative to said brushes during the counting interval.

2. The apparatus defined in claim 1 wherein said pulse shaping means includes amplifier means connected to said voltage discriminator means, a monostable multivibrator connected to said amplifier means and a differentiating circuit connected to said monostable multivibrator.

References Cited

UNITED STATES PATENTS

| | | | |
|---|---|---|---|
| 2,654,860 | 10/1953 | Lewis | 318—490 |
| 2,938,166 | 5/1960 | Hirsh | 324—781 |
| 3,041,520 | 6/1962 | Sidell | 318—490 |
| 3,079,523 | 2/1963 | Thieme | 318—309 |
| 3,219,935 | 11/1965 | Katakami | 324—78 |

FOREIGN PATENTS 691,508  10/1930  France.

OTHER REFERENCES

"Speed Indicator Has Expanded Scale," Electronics, May 1, 1957, pp. 188–190. (Copy in 324–70C–G.)

ARCHIE R. BORCHELT, *Primary Examiner.*

RUDOLPH V. ROLINEC, M. J. LYNCH, *Examiners.*